INVENTOR
PAUL KERNAN

BY Kilman and Kerst
ATTORNEYS

Aug. 4, 1959 P. KERNAN 2,898,461

AMPLITUDE BAND SELECTION CIRCUIT

Original Filed Sept. 30, 1954 2 Sheets-Sheet 2

INVENTOR
PAUL KERNAN

BY Killman and Kerst
ATTORNEYS

United States Patent Office 2,898,461

Patented Aug. 4, 1959

2,898,461

AMPLITUDE BAND SELECTION CIRCUIT

Paul Kernan, Baltimore, Md., assignor to Bendix Aviation Corporation, Towson, Md., a corporation of Delaware Original application September 30, 1954, Serial No. 459,325. Divided and this application June 23, 1958, Serial No. 743,877

1 Claim. (Cl. 250—27)

Figure 1:
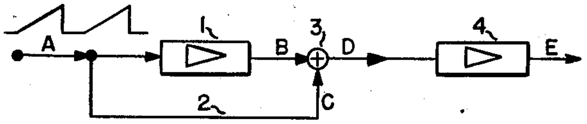

The present invention refers to signal amplitude sensitive circuits and in particular, to circuits capable of providing output signals indicative of distinct bands of amplitudes of input signals.

It is often necessary to provide a signal which is a function of a first signal in that it indicates when the amplitudes of the first signal exist between predetermined maximum and minimum levels. In some systems it is necessary to provide a plurality of signals which are functions of an equal plurality of bands of amplitudes of a first signal. The present invention provides means capable of producing these desired signals.

Circuits of this type are useful in systems wherein electrical or electro-mechanical servo loops exist or in systems where an operator desires to control equipment in accordance with the information received from the circuits. Such systems are too numerous and diversified to discuss at the present time, although the application of the invention to a system for iso-echo contour weather plotting will be discussed.

An object of the present invention is to provide a circuit sensitive to bands of amplitudes of an input signal that is simple in design, operation and construction.

Another object of the present invention is to provide a circuit sensitive to bands of amplitudes of an input signal that requires a minimum of components and space so that it may be easily adapted to aircraft application.

A further object of the present invention is to provide an amplitude sensitive circuit that consumes relatively little power so that it is adaptable to aircraft or portable uses.

These and other objects are realized in a basic circuit where only that part of the input signal that exceeds a predetermined level is amplified and inverted. The resulting signal is then combined with the original signal to produce a signal which is identical to the input signal until the predetermined level is reached, at which point the amplitude begins to diminish and eventually to increase in the opposite polarity. The latter signal is then subjected to a polarity sensitive means which eliminates the portion of the signal of the opposite polarity. A parallel or series combination of the basic circuit produces a composite circuit which is sensitive to a number of amplitude bands equal to the number of the basic circuits that are used. The series combination is disclosed in U.S. patent application Serial No. 459,325, filed September 30, 1954, and entitled "Amplitude Band Selective Circuit," of which the present application is a division.

Figure 3A:
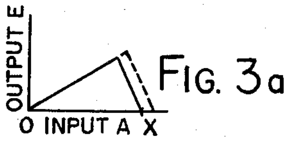
Figure 3B:
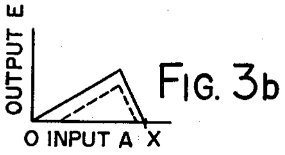
Figure 4:
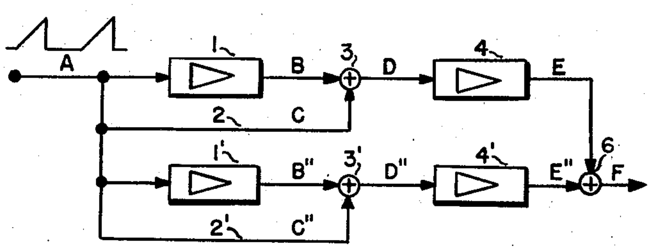
Figures 5A, 5B, 5C, 5D, 5E, 5F, 5G, 5H, 5I, 5J:
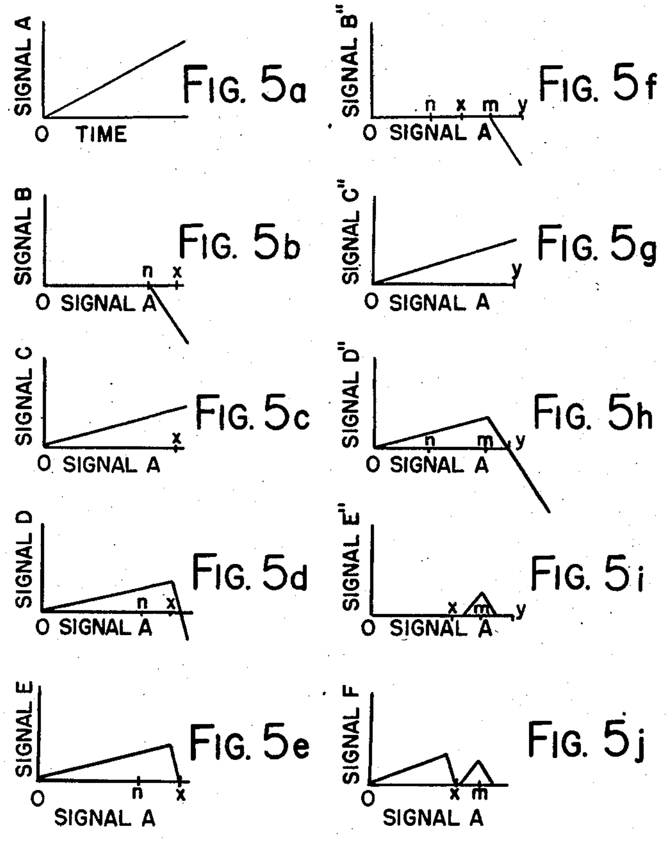
Figure 6:
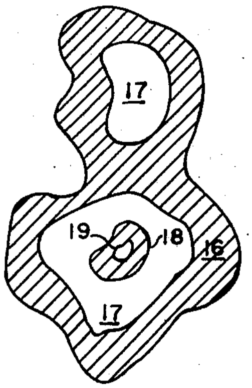

Referring to the drawings:

Fig. 1 is a block diagram of the basic circuit;

Figs. 2*a* through 2*d* illustrate the signals at various points in the circuit of Fig. 1;

Figs. 3*a* and 3*b* illustrate the variations in the output signals when several variables of the circuit of Fig. 1 are varied;

Fig. 4 is a schematic diagram of a parallel combination of several of the circuits of Fig. 1;

Figs. 5*a* through 5*j* illustrate the signals appearing at various points in the circuit of Fig. 4; and Fig. 6 is a drawing of a possible indication that would be displayed on a cathode ray tube through the use of the invention in a radar system.

Figure 2A:
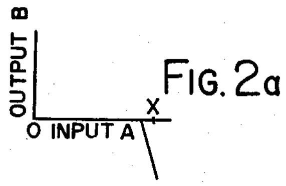
Figure 2D:
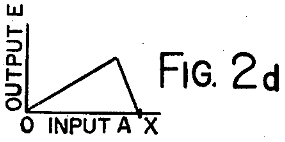
Figure 2B:
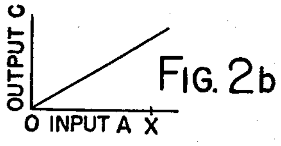
Figure 2C:
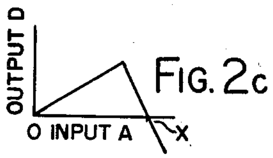

Referring to Fig. 1, a block diagram is shown that illustrates some of the basic fundamentals of the invention. A signal A, shown as a sawtooth waveform for simplicity, is coupled into an amplifier 1. The amplifier 1 is designed to produce an output that is reversed in polarity with respect to the input and to have zero gain until the signal A reaches a predetermined positive polarity level. The amplitude and polarity relationship of the output signal B to the input signal A is illustrated in Fig. 2*a*. A loop 2 around the amplifier 1 is provided so that the unamplified and amplified signals C and B respectively may be added in an adding means 3. The relationship of the unamplified signal C to the signal A is illustrated in Fig. 2*b*. The reversed polarity signal B and the signal C are added to produce a signal D as illustrated in Fig. 2*c*. The signal D is coupled into an amplifier 4 in which only the positive signals are passed. The amplifier 4 is of the cathode follower type. The relationship of the output signal E to the input signal A is illustrated in Fig. 2*d*. Therefore, all input signals A in excess of the amplitude of a point X will not produce any effect in the signal E. The signal E is therefore indicative of values of the signal A between the amplitudes of the points O and X.

The signal amplitude bandwidth may be changed by varying the operating characteristics in the amplifiers 1 and 4. That is, as the aforementioned predetermined level of amplifier 1 is increased, the point at which the signal output E begins to drop moves to the right, that is, the sensitivity band is widened by producing an output for larger input signals. By varying the operating characteristics of the amplifier 4, the amplitude and bandwidth of the signal E will vary. This is produced by making the amplifier 4 less sensitive so that a larger signal D is necessary to produce the signal E, which will be indicative of a smaller bandwidth as both extremities will move toward the center. These changes are illustrated by the broken line curves in Figs. 3*a* and 3*b*, respectively.

An indication of a multiplicity of amplitude bandwidths may be accomplished by either of two combinations of a number of the arrangement of Fig. 1. A number of features of each combination will be stated in conjunction with a discussion thereon.

A block diagram of a system that illustrates a combination of circuits of the type illustrated in Fig. 1 is shown in Fig. 4. This combination will be referred to as the parallel combination. The symbols identifying the parts contained therein are identical to those used previously as the construction and operating characteristics thereof are similar. Fig. 5*a* shows the input signal A as a function of time. Figs. 5*b* through 5*e* are produced in the same manner as Figs. 2*a* through 2*d*. Fig. 5*f* is similar to Fig. 5*b* except the predetermined level of amplifier 1' has been set at a higher level. Figs. 5*g* and 5*h* are produced in the same manner as Figs. 5*c* and 5*d*. Fig. 5*i* is produced by adjusting the amplifier 4' so that it operates only on signals of amplitudes that are high with respect to the amplitudes on which the amplifier 4 operates. The composite signal E produced by the adding means 6 is shown in Fig. 5*j*. The production of additional amplitude band indications may be provided by adding a like number of channels.

In the present combination, each channel operates independently of the other channels. Consequently, any adjustments as described in conjunction with Fig. 1 may be applied to each channel and only the part of the composite signal E that is attributable to that particular channel will be affected.

Although both combinations may be arranged to produce similar results, one may be preferred over the other because of the features previously stated. That is, in the series combination disclosed in the above mentioned application Serial No. 459,325, the characteristics of the amplifiers 1, 1', etc. may vary but the width of the notches will remain constant. Also, any variations in one of these amplifiers 1, 1', etc. will produce a uniform shift in amplitude indications produced by the succeeding amplifiers 1, 1', etc. In the parallel combination, a change in one of the amplifiers 1, 1', etc. will not affect the other indications but may cause the disappearance of a notch to occur.

A particular use of the present invention is the application thereof as a contour circuit in a radar system for producing weather information. A normal radar display indicates echo returns from large masses of moisture that exist in the atmosphere. However, it is almost impossible to distinguish between different moisture densities. When the present invention is applied thereto, the moisture density is discernible by the amplitude sensitivity of the invention to the video signals obtained from the echo signals. Because of this, the pattern produced on the receiving screen will contain contours indicating areas of various moisture densities. This is particularly helpful in aircraft usage as it enables the pilot to avoid areas of heavy rainfall, or if this proves impractical, to evade areas containing large rainfall gradients. Flight tests have demonstrated that heavy gusts of wind and generally bad flying conditions can be expected in areas where a large rainfall gradient exists.

Referring to Fig. 6, a sketch is shown of a part of a possible indication that would be displayed through the use of the present invention in a radar system. An outer contour 16 indicates areas of relatively light rainfall, as the lighter rainfall causes relatively weak echo signals.

Contours 17 are produced from the notch 2 and indicate areas of greater rainfall. A contour 18 is produced by the second indication of Fig. 5*j* and identifies an area of still greater rainfall. The maximum rainfall is indicated by a contour 19 which is produced by the echo signal being sufficiently strong to provide a video signal that exceeds the amplitude necessary to produce the aforementioned second indication. The contours 16 and 18 are shaded to indicate that the illumination intensity of these areas of the viewing tube are different from the remainder of the viewing area.

Although the use of the invention in radar weather plotting has been discussed, the application of the invention to other uses is evident. Therefore, it is to be understood that the invention is not restricted to use in radar weather plotting systems.

What is claimed is:

A signal amplitude sensitive system comprising: a plurality of circuits each comprising an inverting amplifier responsive to signals of a predetermined polarity and adjustably responsive to amplify only the parts thereof that exceed a predetermined level, an adding means having two inputs, means applying the output of the said amplifier to one of the inputs of the said adding means, means sensitive only to signals of the said predetermined polarity and adjustably responsive to the parts thereof that exceed a predetermined level, and means applying the output of the said adding means to the input of the said polarity sensitive means; means applying an input signal to the said amplifier of each of the said circuits; means applying the said input signal to the remaining input of the said adding means of each of the said circuits; a second adding means; means applying the output of the said sensitive means of each of the said circuits to the said second adding means; and means rendering available the output from the said second adding means.

No references cited.